(12) United States Patent
Lee

(10) Patent No.: US 9,276,281 B2
(45) Date of Patent: Mar. 1, 2016

(54) MANUFACTURING A FUEL CELL MEMBRANE-ELECTRODE ASSEMBLY

(75) Inventor: Jae Seung Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 1169 days.

(21) Appl. No.: 13/103,207

(22) Filed: May 9, 2011

(65) Prior Publication Data

US 2012/0141920 A1 Jun. 7, 2012

(30) Foreign Application Priority Data

Dec. 3, 2010 (KR) ........................ 10-2010-0122438

(51) Int. Cl.
| | |
|---|---|
| H01M 8/10 | (2006.01) |
| B05B 5/08 | (2006.01) |
| B05C 1/08 | (2006.01) |
| B05C 9/04 | (2006.01) |
| H01M 4/88 | (2006.01) |

(52) U.S. Cl.
CPC ............... *H01M 8/1004* (2013.01); *B05B 5/08* (2013.01); *B05C 1/0813* (2013.01); *B05C 9/04* (2013.01); *H01M 4/8853* (2013.01); *H01M 4/8896* (2013.01); *Y02E 60/521* (2013.01); *Y02P 70/56* (2015.11)

(58) Field of Classification Search
CPC ........................................................ H01M 8/10
See application file for complete search history.

(56) References Cited

U.S. PATENT DOCUMENTS

| 2002/0167109 A1* | 11/2002 | Klug ................... B29C 43/222 264/175 |
|---|---|---|
| 2006/0083971 A1 | 4/2006 | DeSimone et al. |
| 2008/0210302 A1 | 9/2008 | Gupta |
| 2010/0102026 A1 | 4/2010 | Lee et al. |

FOREIGN PATENT DOCUMENTS

| JP | 2004-139846 | * | 5/2004 | ............ Y02E 60/521 |
|---|---|---|---|---|
| JP | 2007-103122 A | | 4/2007 | |
| KR | 10-2008-0067837 | | 7/2008 | |
| KR | 10-2008-0109084 | | 12/2008 | |

OTHER PUBLICATIONS

A.M. Chaparro, M.A. Folgado, B. Gallardo, A.J. Martin, L. Daza., Properties of catalyst layers prepared by electrospray deposition, ECS Transactions, 25(1) 1221-1225.*

* cited by examiner

*Primary Examiner* — Edu E Enin-Okut
*Assistant Examiner* — Seenam Agbetiafan
(74) *Attorney, Agent, or Firm* — Mintz Levin Cohn Ferris Glovsky and Popeo, P.C.; Peter F. Corless

(57) ABSTRACT

The present invention provides an apparatus and method for manufacturing a fuel cell membrane-electrode assembly by forming a catalyst layer, which has uniform distribution, excellent porosity, and excellent bondability to a polymer electrolyte membrane, on a metal roll by an electrospray process and transferring the catalyst layer to a polymer electrolyte membrane.

9 Claims, 6 Drawing Sheets

MANUFACTURING A FUEL CELL MEMBRANE-ELECTRODE ASSEMBLY

CROSS-REFERENCE TO RELATED APPLICATION

This application claims under 35 U.S.C. §119(a) the benefit of Korean Patent Application No. 10-2010-0122438 filed Dec. 3, 2010, the entire contents of which are incorporated herein by reference.

BACKGROUND (a) Technical Field

The present disclosure relates to an apparatus and method for manufacturing a fuel cell membrane-electrode assembly (MEA). More particularly, it relates to an apparatus and method for manufacturing a fuel cell membrane-electrode assembly by forming a catalyst layer, which has uniform distribution, excellent porosity, and excellent bondability to a polymer electrolyte membrane, on a metal roll by an electrospray process and transferring the catalyst layer to a polymer electrolyte membrane.

(b) Background Art

A fuel cell stack, which substantially generates electricity, in a fuel cell system has a structure in which several tens to several hundreds of unit cells, each comprising a membrane-electrode assembly (MEA) and a separator, are stacked together.

The MEA comprises a polymer electrolyte membrane, a negative electrode and a positive electrode, which are disposed on each of both sides of the polymer electrolyte membrane. The negative electrode ("hydrogen electrode", "fuel electrode", "anode", or "oxidizing electrode") and the positive electrode ("air electrode", "oxygen electrode", "cathode", or "reducing electrode") are configured in such a manner that a catalyst layer comprising platinum catalyst nanoparticles is formed on an electrode backing layer such as carbon paper or carbon cloth.

Conventional methods for manufacturing membrane-electrode assemblies will be described below. As shown in FIG. 3, a catalyst slurry is coated, sprayed or painted on a gas diffusion layer to form an electrode, and the electrode is bonded to a polymer electrolyte membrane by thermal compression. Otherwise, as shown in FIG. 4, a catalyst slurry is coated, sprayed or painted directly on a polymer membrane and the resulting polymer membrane is bonded to a gas diffusion layer. As another method, as shown in FIG. 5, a catalyst slurry is coated, sprayed or painted on a release paper and transferred to a polymer membrane to form an electrode, and the electrode is bonded to a gas diffusion layer.

However, when the catalyst slurry is applied on the gas diffusion layer as in FIG. 3, it is advantageous to form pores but is inconvenient to manufacture the MEA, and thus it is not used in a commercial process.

Moreover, the method of directly forming the catalyst layer on the polymer membrane as in FIG. 4 can manufacture small area electrodes. However, during manufacturing of large area electrodes, when the catalyst layer is in contact with the polymer membrane, the polymer membrane absorbs the catalyst slurry and is deformed. Therefore, it is difficult to manufacture the large area electrode due to the deformation of the polymer membrane.

Furthermore, in the case of the method of forming the catalyst layer on the release paper and transferring the catalyst layer to the polymer membrane as in FIG. 5, a process of transferring the catalyst layer to the polymer membrane by compression at high temperature and pressure is required after forming the catalyst layer on the release paper. Moreover, the bonding between the catalyst layer and the polymer membrane is incomplete, which causes deterioration of performance and durability.

The method of forming the catalyst layer generally includes a method of spraying a catalyst slurry on a substrate (e.g., membrane, release paper, gas diffusion layer, etc) using a spray and a method of coating a liquefied catalyst slurry on a substrate using a coater.

In the case of forming the catalyst layer by the spray method, pores are formed in the catalyst layer, and thus the supply of fuel and the discharge of produced water are facilitated. However, the amount of catalyst lost is large, it takes a long time to form the catalyst layer, and materials (e.g., catalyst, binder, other additives, etc.) mixed with the catalyst slurry are non-uniformly formed in the catalyst layer.

Moreover, in the case of coating a liquefied catalyst slurry on the substrate, the amount of catalyst lost is small and it takes a short time to form the catalyst layer. However, materials (e.g., catalyst, binder, other additives, etc.) mixed with the catalyst slurry are non-uniformly formed in the catalyst layer, and the catalyst layer is densely formed, which prevents the formation of pores and makes it difficult to supply fuel and discharge produced water.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention is directed to alleviating the above-described problems associated with prior art. Accordingly, the present invention provides an apparatus and method for manufacturing a fuel cell membrane-electrode assembly by forming a catalyst layer, which has uniform distribution, excellent porosity, and excellent bondability to a polymer electrolyte membrane, on a metal roll by an electrospray process and transferring the catalyst layer to a polymer electrolyte membrane.

In one aspect, the present invention provides an apparatus for manufacturing a fuel cell membrane-electrode assembly, the apparatus comprising: a plurality of sprays receiving and storing a catalyst slurry; a pair of metal drums to which the catalyst slurry injected from the sprays is applied; a voltage supply source applying a voltage to the sprays and the metal drums; and a dry heating means provided in the metal drums, respectively, and drying the catalyst slurry applied to the surface of the metal drums.

In one embodiment, the position and number of the sprays, the rotational speed of the drums, the distance between the surface of the sprays and the surface of each of the metal drums, and the voltage applied between the metal drums and the sprays are controlled according to the area of a catalyst layer formed on the surface of each of the metal drum and the amount of catalyst applied.

In another embodiment, each of the metal drums comprises a pattern formed on the surface thereof to determine the size and shape of the catalyst layer.

In still another embodiment, the periphery of the pattern on each of the metal drums is coated with an insulating material such that the voltage is applied only to the pattern.

In yet another embodiment, the dry heating means comprises a heating coil provided in the metal drums.

In another aspect, the present invention provides a method for manufacturing a fuel cell membrane-electrode assembly, the method comprising: spacing a plurality of sprays storing a catalyst slurry from a pair of metal drums and applying a voltage between the sprays and the metal drums; allowing the catalyst slurry injected through a tip of each of the sprays to cause a Coulomb explosion and be coated on the metal drums; and allowing a catalyst layer to be transferred to both surfaces of a polymer electrolyte membrane fed by rotation of the metal drums.

In one embodiment, the method further comprises drying the catalyst slurry applied to the surface of the metal drums by heating the metal drums.

In another embodiment, the catalyst slurry is injected in a nitrogen atmosphere.

Other aspects and embodiments of the invention are discussed hereinafter.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1A:
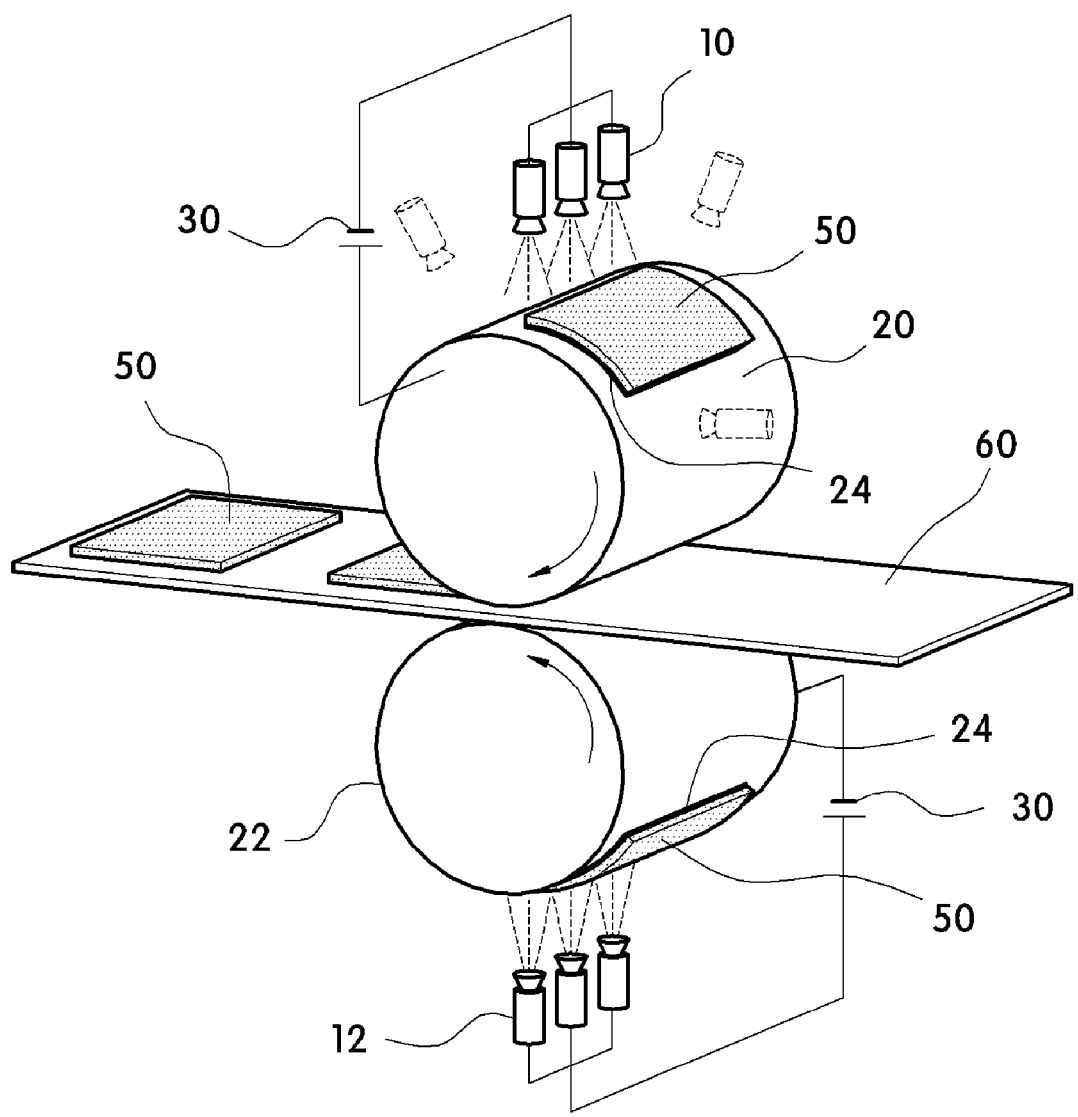
FIGS. 1A and 1B are schematic diagrams showing an apparatus for manufacturing a fuel cell membrane-electrode assembly in accordance with an example embodiment of the present invention.

Reference numerals set forth in the Drawings includes reference to the following elements as further discussed below:

10, 12: spray;
20, 22: metal drum;
24: pattern;
30: voltage supply source;
40: dry heating means;
50: catalyst layer; and
60: polymer electrolyte membrane.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Also, it is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

As mentioned above, conventional methods for manufacturing membrane-electrode assemblies include a method of forming a catalyst layer on a release paper and transferring the catalyst layer to a polymer electrolyte membrane and a method of forming a catalyst layer directly on a polymer electrolyte membrane. However, according to the former method, its manufacturing process is complicated, the manufacturing yield is low, the manufacturing time is increased, and the bondability between the catalyst layer and the polymer membrane is low, which reduces the performance and durability of the membrane-electrode assembly. According to the latter method, since the catalyst layer is applied directly to the polymer membrane, the polymer membrane may be deformed, which makes it difficult to manufacture the membrane-electrode assembly.

To address these problems, the present invention utilizes an electrospray process to form a catalyst layer which is to be bonded to a polymer electrolyte membrane.

Referring to a recent article published by the Electrochemical Society (ECS), ECS Transactions, 25(1) 1221-1227 (2009), a theoretical basis for the electrospray process of spraying a catalyst slurry using a large difference in voltage between a spray tip and a substrate has been described. Accordingly, when a high voltage of 4 to 6 kV is applied between the spray tip and the substrate and an appropriate height is maintained, the catalyst slurry at the end of the spray tip causes a Coulomb explosion to be formed into a catalyst layer.

At this time, the catalyst layer is formed at a portion where the voltage is applied, and thus the catalyst is not lost, unlike a typical spray using air.

Figure 2:
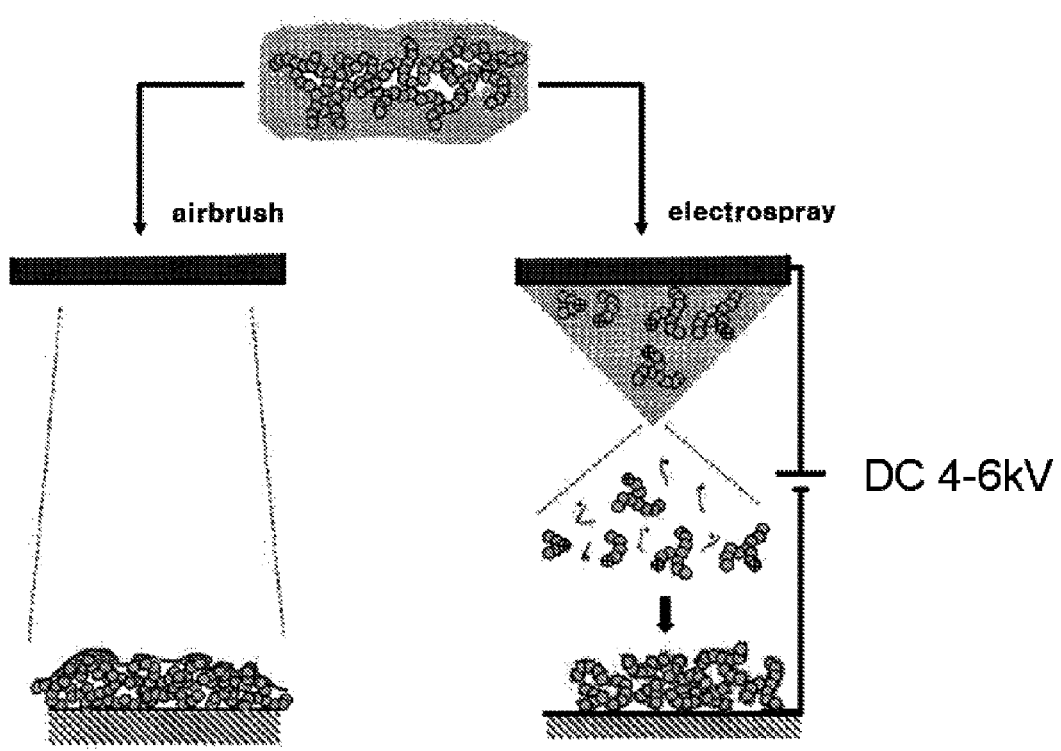
FIG. 2 is a schematic diagram showing the theoretical basis for a method of injecting a catalyst slurry spray by an electrospray process.
Figure 3:
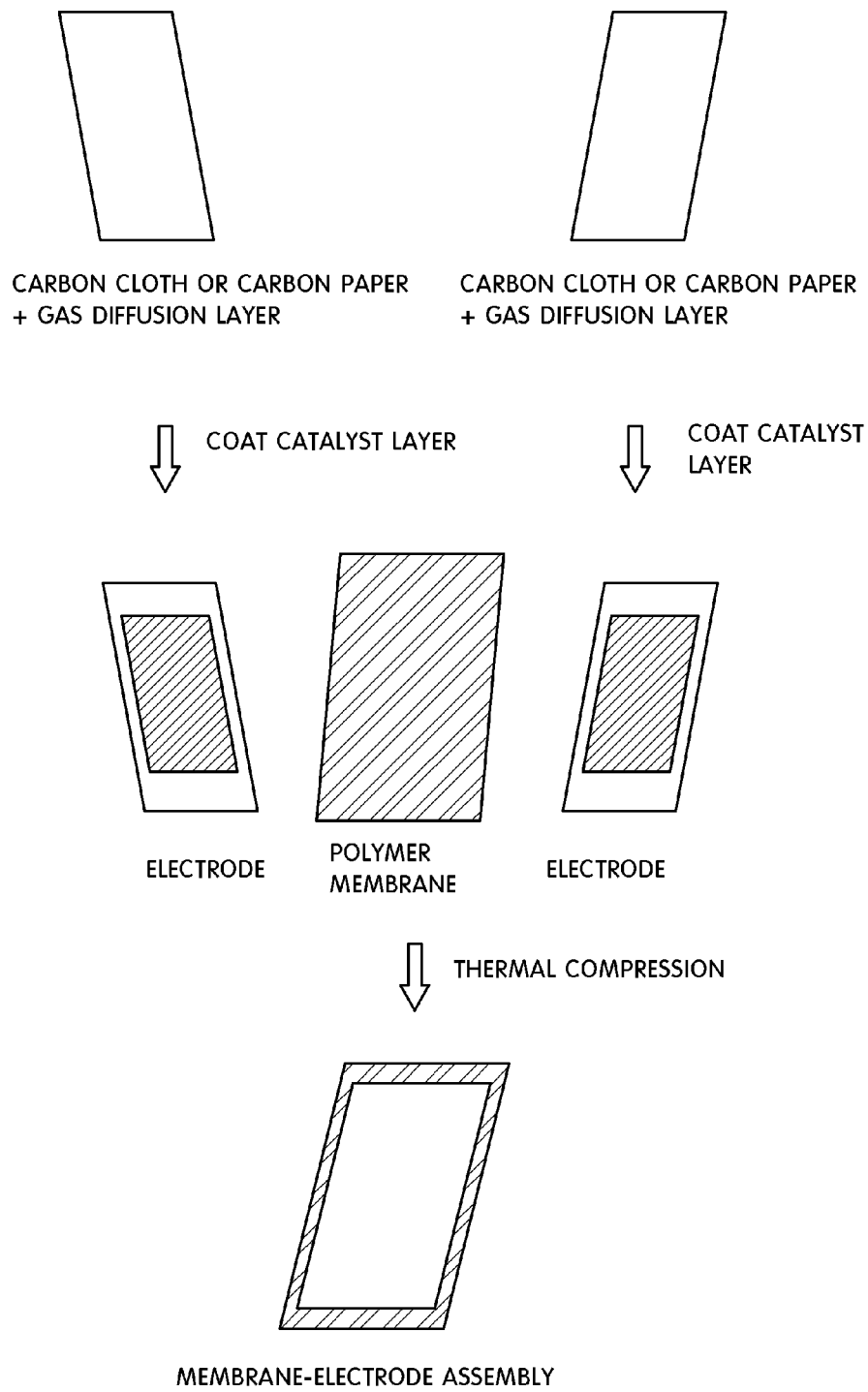
FIG. 3 is a schematic diagram showing a method for manufacturing a membrane-electrode assembly by coating a catalyst layer on a gas diffusion layer to form an electrode and bonding the electrode to a polymer membrane by thermal compression.
Figure 4:
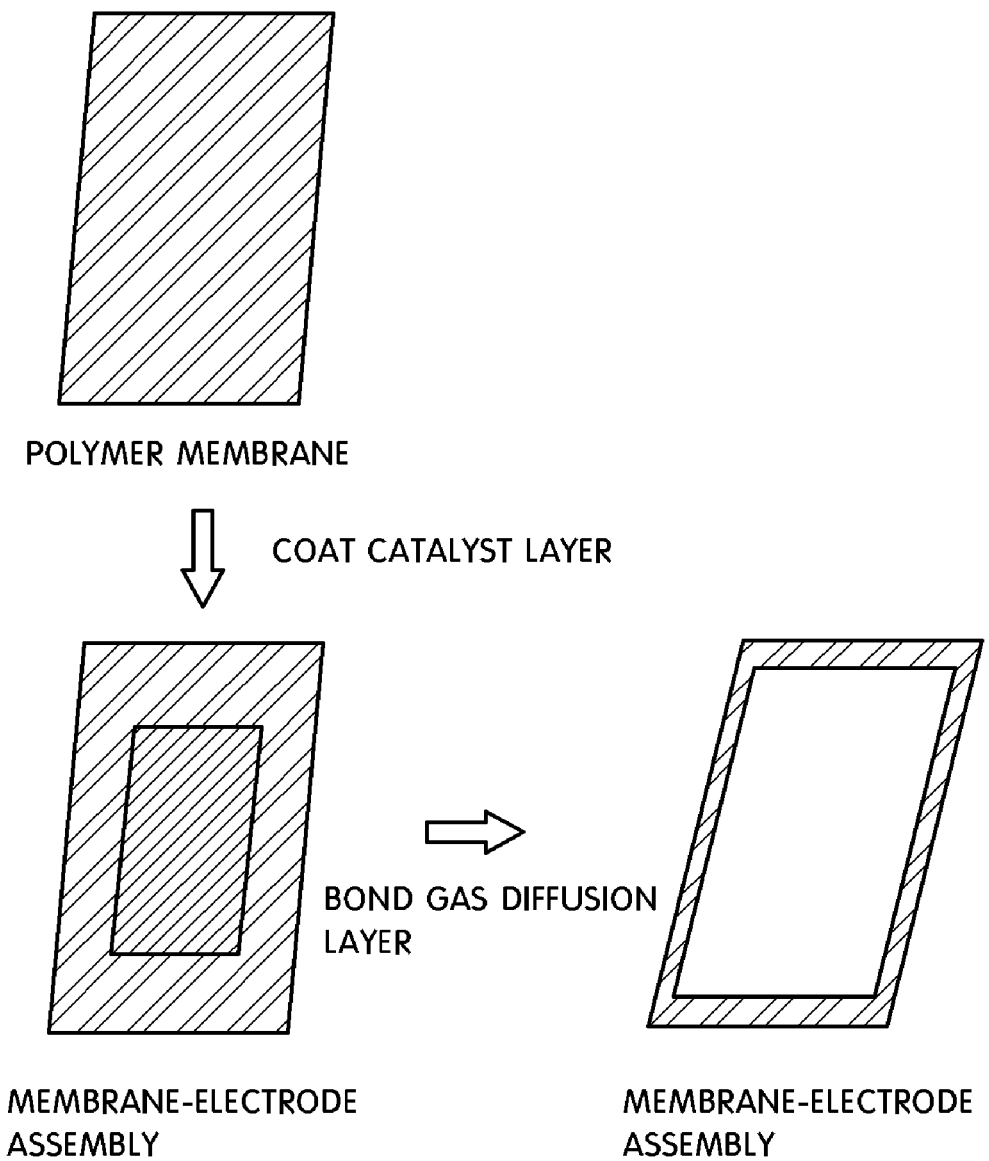
FIG. 4 is a schematic diagram showing a method for manufacturing a membrane-electrode assembly by coating a catalyst layer directly on a polymer membrane and bonding the polymer membrane to a gas diffusion layer.
Figure 5:
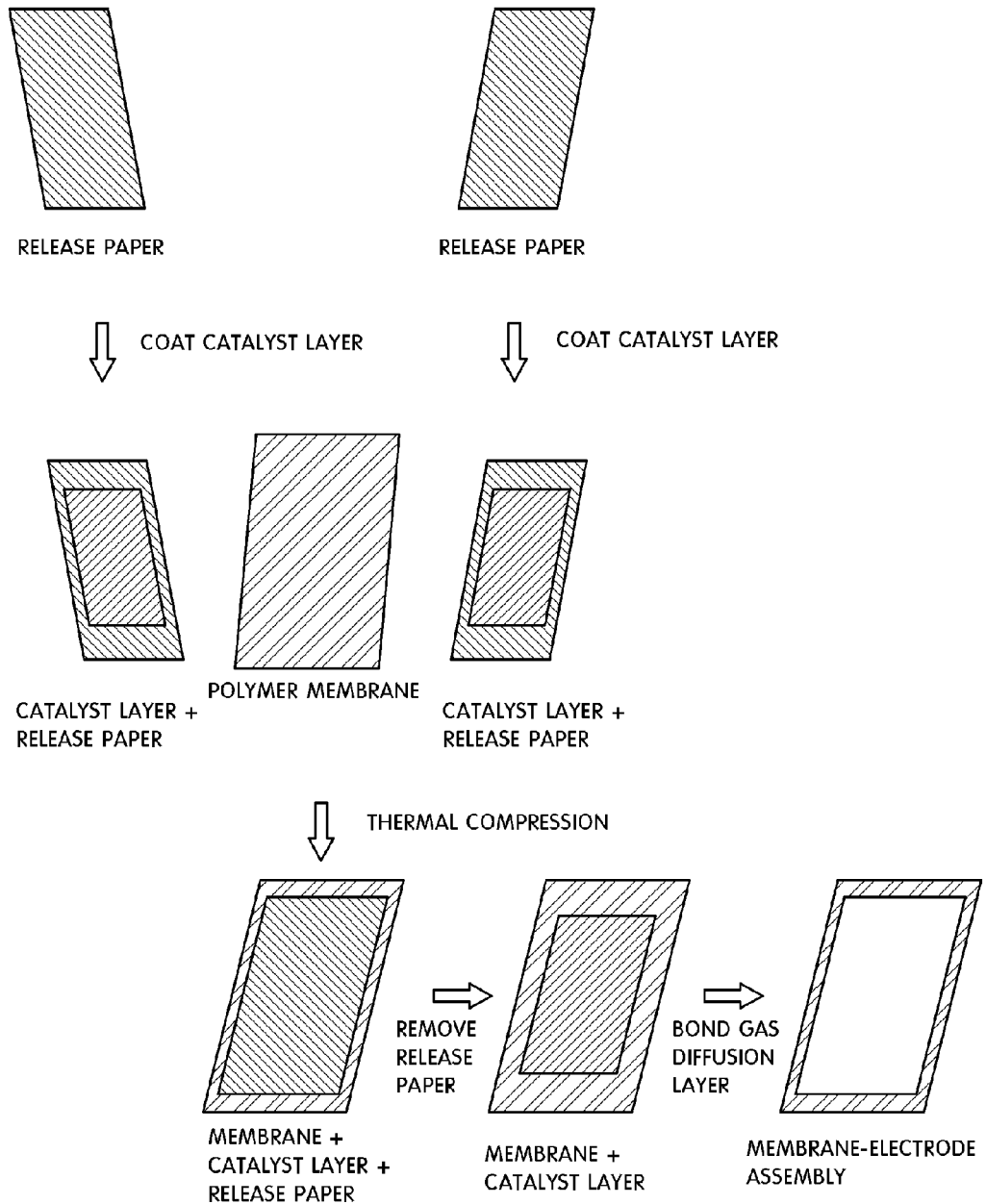
FIG. 5 is a schematic diagram showing a method for manufacturing a membrane-electrode assembly by coating a catalyst layer on a release paper, transferring the catalyst layer on the release paper to a polymer membrane, and bonding the polymer membrane to a gas diffusion layer.

Moreover, as shown in FIG. 2, unlike a catalyst layer formed by an airbrush process, the catalyst layer formed by the electrospray process contains slurry particles having a very uniform distribution, and additives such as catalyst, binder, etc. are uniformly mixed and formed into the catalyst layer, thereby increasing the utilization of the catalyst.

In view of the foregoing, the present invention provides an apparatus and method for manufacturing a fuel cell membrane-electrode assembly by spraying a catalyst slurry on a drum by an electrospray process, drying the catalyst slurry to form a catalyst layer, and continuously transferring the catalyst layer to a polymer electrolyte membrane.

Figure 1B:
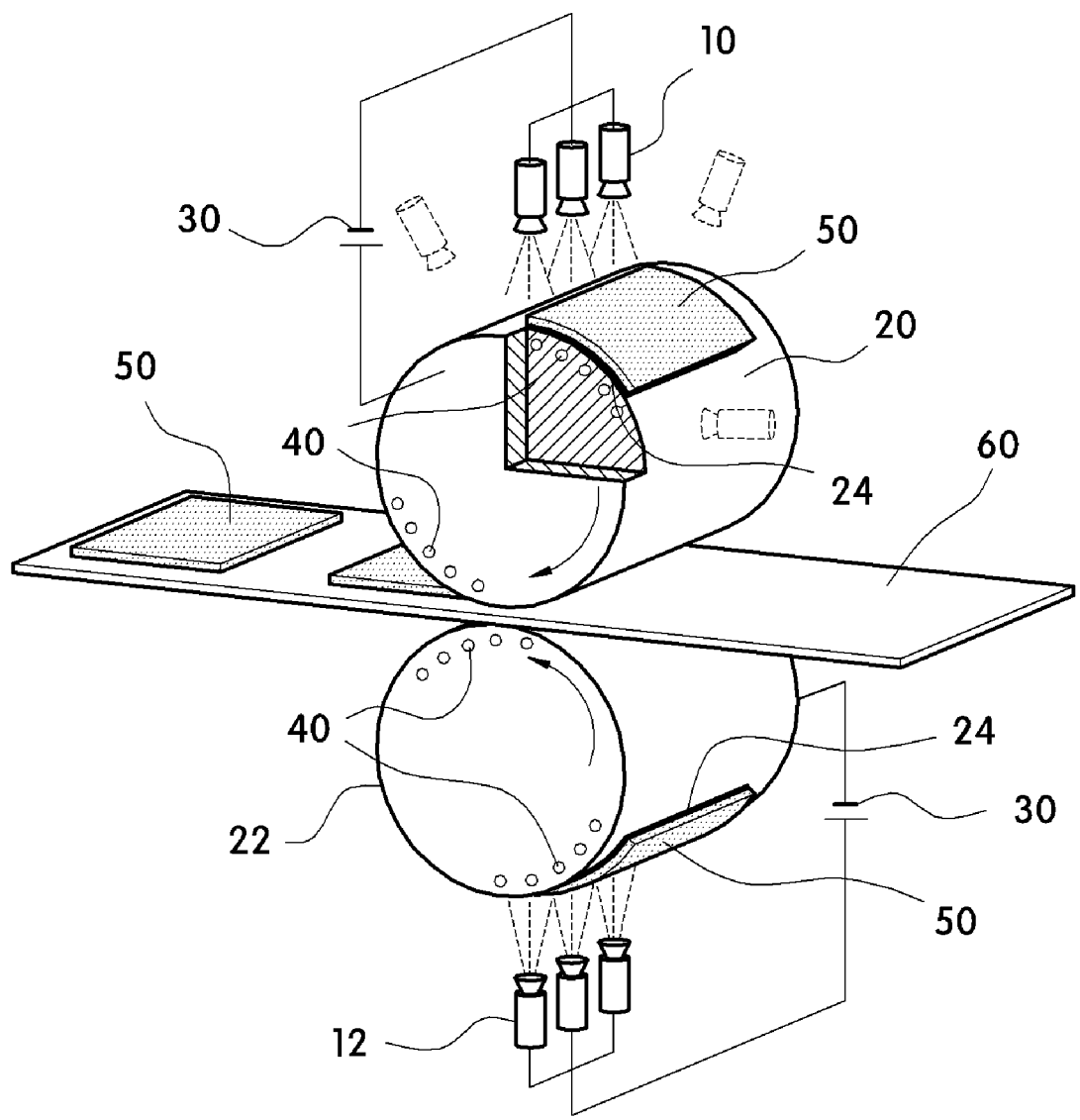

Referring to FIGS. 1A and 1B, an apparatus for manufacturing a fuel cell membrane-electrode assembly of the present invention employs an electrospray process and comprises a plurality of sprays 10 and 12 periodically receiving and storing a catalyst slurry from an external supply source, a pair of metal drums 20 and 22 to which the catalyst slurry injected from the sprays 10 and 12 is applied, a voltage supply source 30 applying a voltage to the sprays 10 and 12 and the metal drums 20 and 22, and in certain embodiments (FIG. 1b) a dry heating means 40 (e.g., a heating coil) provided in the metal drums 20 and 22 and drying the catalyst slurry applied to the surface of the metal drums 20 and 22.

Illustratively, the sprays 10 and 12 comprise an upper spray 10 injecting the catalyst slurry onto the surface of the upper metal drum 20 and a lower spray 12 injecting the catalyst slurry onto the surface of the lower metal drum 22.

Here, the position and number of the upper and lower sprays 10 and 12, the rotational speed of the upper and lower drums 20 and 22, the distance between the surface of the sprays 10 and 12 and the surface of each of the metal drums 20 and 22, and the voltage applied between the metal drums 20 and 22 and the sprays 10 and 12 can be controlled according to the area of a catalyst layer 50 formed on the surface of each of the metal drum 20 and 22 and the amount of catalyst applied. As shown, sprays in shadow (dashed lines) illustrate various alternative or additional placements of sprays, and the locations of any sprays 10 and 12 shown are merely illustrative examples.

In one embodiment, a pattern 24 for determining the size and shape of the catalyst layer 50 is formed into fine engraved shapes or fine embossed shapes on the surface of each of the metal drums 20 and 22 and an insulating material is coated on the periphery of the pattern 24 of each of the metal drums 20 and 22 such that the voltage is applied only to the pattern 24 for determining the size and shape of the catalyst layer 50.

Next, a method for manufacturing a fuel cell membrane-electrode assembly of the present invention based on the above-described configuration will be described.

First, a voltage is applied from the voltage supply source 30 to the upper and lower sprays 10 and 12 storing the catalyst slurry and to the corresponding upper and lower metal drums 20 and 22.

That is, an appropriate voltage is applied to the upper and lower sprays 10 and 12 storing the catalyst slurry and the upper and lower metal drums 20 and 22 to which the catalyst slurry is applied, and then the catalyst slurry is sprayed from the sprays 10 and 12 onto the upper and lower metal drums 20 and 22 for a predetermined period of time.

At this time, the catalyst slurry injected through a tip of each of the sprays 10 and 12 causes a Coulomb explosion and is coated on the upper and lower metal drums 20 and 22.

Meanwhile, in the catalyst slurry, a catalyst in which platinum or platinum alloy is supported on carbon and a fluorine-based polymer electrolyte ionomer or a hydrocarbon-based polymer electrolyte ionomer are mixed with a solvent. Moreover, the catalyst slurry may comprise an ionic additive for controlling an electric charge and a solvent, and the solvent may include, but not limited to, water, alcohol, etc.

Furthermore, a predetermined amount of carbon fibers or radical scavenger may be added to the catalyst slurry to reinforce the structure of the catalyst layer.

In one embodiment, the area of the catalyst layer 50 formed on the surface of each of the metal drums 20 and 22 and the amount of catalyst applied can be determined by controlling the position and number of the upper and lower sprays 10 and 12, the rotational speed of the upper and lower drums 20 and 22, the distance between the surface of the sprays 10 and 12 and the surface of each of the metal drums 20 and 22, and the voltage applied between the metal drums 20 and 22 and the sprays 10 and 12.

The catalyst slurry coated on the upper and lower metal drums 20 and 22, e.g., on the surface of the pattern 24 formed on each of the metal drums 20 and 22, is dried by the dry heating means 40 provided in the metal drums 20 and 22 to be formed into the catalyst layer 50 capable of being bonded to a polymer electrolyte membrane 60.

At this time, the atmosphere in which the catalyst slurry is injected may be a nitrogen atmosphere or other atmospheres. Moreover, the dry condition can be determined to a desired level by controlling the ambient temperature according to the dry state of the catalyst layer.

That is, the dry state of the catalyst layer can be controlled by controlling the surface temperature and the rotational speed of the metal drums 20 and 22, and the bonding between the catalyst layer and the polymer membrane can be optimized.

If the catalyst layer is insufficiently dried, the catalyst layer cannot be completely transferred to the surface of the polymer electrolyte membrane, whereas, if the catalyst layer is excessively dried, the bondability between the catalyst layer and the polymer electrolyte membrane may be insufficient. Therefore, in an illustrative embodiment, the bonding operation is performed under optimized transfer conditions by controlling the heating temperature, the distance between the upper and lower metal drums 20 and 22, and the bonding pressure.

When the polymer electrolyte membrane is loaded between the upper and lower metal drums 20 and 22 on which the catalyst layer 50 is formed respectively, the catalyst layer 50 formed on each the upper and lower metal drums 20 and 22 is transferred and bonded to both surfaces of the polymer electrolyte membrane to be formed into an anode and a cathode, respectively.

As described above, the present invention provides the following effects.

According to the present invention, the catalyst slurry is sprayed (e.g., directly) onto the metal roll drums by the electrospray process to form the catalyst layer 50, and thus it is possible to form an electrode pattern by controlling the voltage applied thereto and increase the manufacturing yield of the electrodes due to the uniform distribution and high porosity of the catalyst layer.

Moreover, since the membrane-electrode assembly may be manufactured by drying the catalyst layer by heating the metal drums to an appropriate temperature and transferring the dried catalyst layer directly to the polymer electrolyte membrane, it is possible to improve the bondability between the catalyst layer and the polymer electrolyte membrane and simplify the manufacturing process of the membrane-electrode assembly to reduce the manufacturing cost.

Furthermore, it is possible to control the shape and size of the catalyst layer, i.e., the electrode, by employing various patterns of the metal drums and reduce the amount of catalyst lost due to excellent bondability between the catalyst layer and the polymer electrolyte membrane.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for manufacturing a fuel cell membrane-electrode assembly, the method comprising:
    storing a catalyst slurry in a plurality of sprays spaced from a pair of metal drums;
    applying a voltage between the sprays and the metal drums;
    injecting the catalyst slurry through a tip of each of the sprays toward the metal drums, wherein the catalyst slurry and voltage cause a Coulomb explosion to coat the catalyst slurry on the metal drums as a catalyst layer; and
    transferring the catalyst layer to both surfaces of a polymer electrolyte membrane fed by rotation through the metal drums,
    wherein a pattern for determining the size and shape of the catalyst layer is formed into fine engraved shapes or fine embossed shapes on the surface of each of the pair of the metal drums and an insulating material is coated on the periphery of the pattern of each of the metal drums such that the voltage is applied only to the pattern for determining the size and shape of the catalyst layer when applying the voltage to the metal drums.

2. The method of claim 1, further comprising drying the catalyst slurry applied to a surface of the metal drums by heating the metal drums.

3. The method of claim 1, wherein the catalyst slurry is injected in a nitrogen atmosphere.

4. The method of claim 1, further comprising: controlling a position and number of the sprays, a rotational speed of the drums, a distance between a surface of the sprays and a surface of each of the metal drums, and the voltage applied between the metal drums and the sprays according to an area of a catalyst layer formed on the surface of each of the metal drums and the amount of catalyst applied.

5. A method for manufacturing a fuel cell membrane-electrode assembly, the method comprising:
    applying a voltage between one or more sprays spaced from a first metal drum and between one or more sprays spaced from a second metal drum;
    spraying a catalyst slurry from each of the sprays toward the corresponding first and second metal drums, wherein the catalyst slurry and voltage cause a Coulomb explosion to coat the catalyst slurry on the metal drums as a catalyst layer; and
    transferring the catalyst layer to both surfaces of a polymer electrolyte membrane fed between the metal drums,
    wherein each of the metal drums comprises a pattern formed on a surface thereof to determine a size and a shape of a catalyst layer formed by the applied catalyst,
    wherein the pattern is formed into fine engraved shapes or fine embossed shapes on the surface of each of the pair of the metal drums and an insulating material is coated on the periphery of the pattern of each of the metal drums such that the voltage is applied only to the pattern for determining the size and shape of the catalyst layer when applying the voltage to the metal drums.

6. The method of claim 5, further comprising heating the metal drums to dry the catalyst slurry on the metal drums.

7. The method of claim 5, wherein the catalyst slurry is sprayed in a nitrogen atmosphere.

8. The method of claim 5, further comprising: controlling a position and number of the sprays, a rotational speed of the drums, a distance between a surface of the sprays and a surface of each of the metal drums, and the voltage applied between the metal drums and the sprays according to an area of a catalyst layer formed on the surface of each of the metal drums and the amount of catalyst applied.

9. The method of claim 5, further comprising: feeding the polymer electrolyte membrane between the metal drums by rotation of the metal drums.

* * * * *